Jan. 31, 1961  A. MAIMON  2,969,821
SCOURING MACHINE FOR SCOURING GRAIN
Filed Dec. 29, 1958  2 Sheets-Sheet 1

INVENTOR.
ACHARON MAIMON
BY Arthur H. Seidel
ATTORNEY

INVENTOR
ACHARON MAIMON

United States Patent Office 2,969,821
Patented Jan. 31, 1961

2,969,821

SCOURING MACHINE FOR SCOURING GRAIN

Acharon Maimon, Tel Aviv, Israel
(% Fishman, 635 Park Lane, Philadelphia, Pa.)

Filed Dec. 29, 1958, Ser. No. 783,611

10 Claims. (Cl. 146—296)

This invention relates to a scouring machine and process for scouring grain. More particularly, this invention relates to a machine and process for removing all outer layers of bran from kernels of grain.

A kernel of grain comprises an inner germ and endosperm which are covered by layers of bran. When grain is processed into flour, cereals, and the like, only the inner germ and endosperm are used. Therefore, it is necessary to remove the outer layers of bran from the kernels of the grain leaving only the germ and endosperm for further processing.

It is an object of the present invention to provide a scouring machine.

It is another object of the present invention to provide a scouring machine for removing all outer layers of bran from kernels of grain.

It is a further object of the present invention to provide a process for scouring kernels of grain.

Other objects will appear hereinafter.

For the purpose of illustrating the invention there is shown in the drawings a form which is presently preferred; it being understood, however, that this invention is not limited to the precise arrangements and instrumentalities shown.

Figure 1:
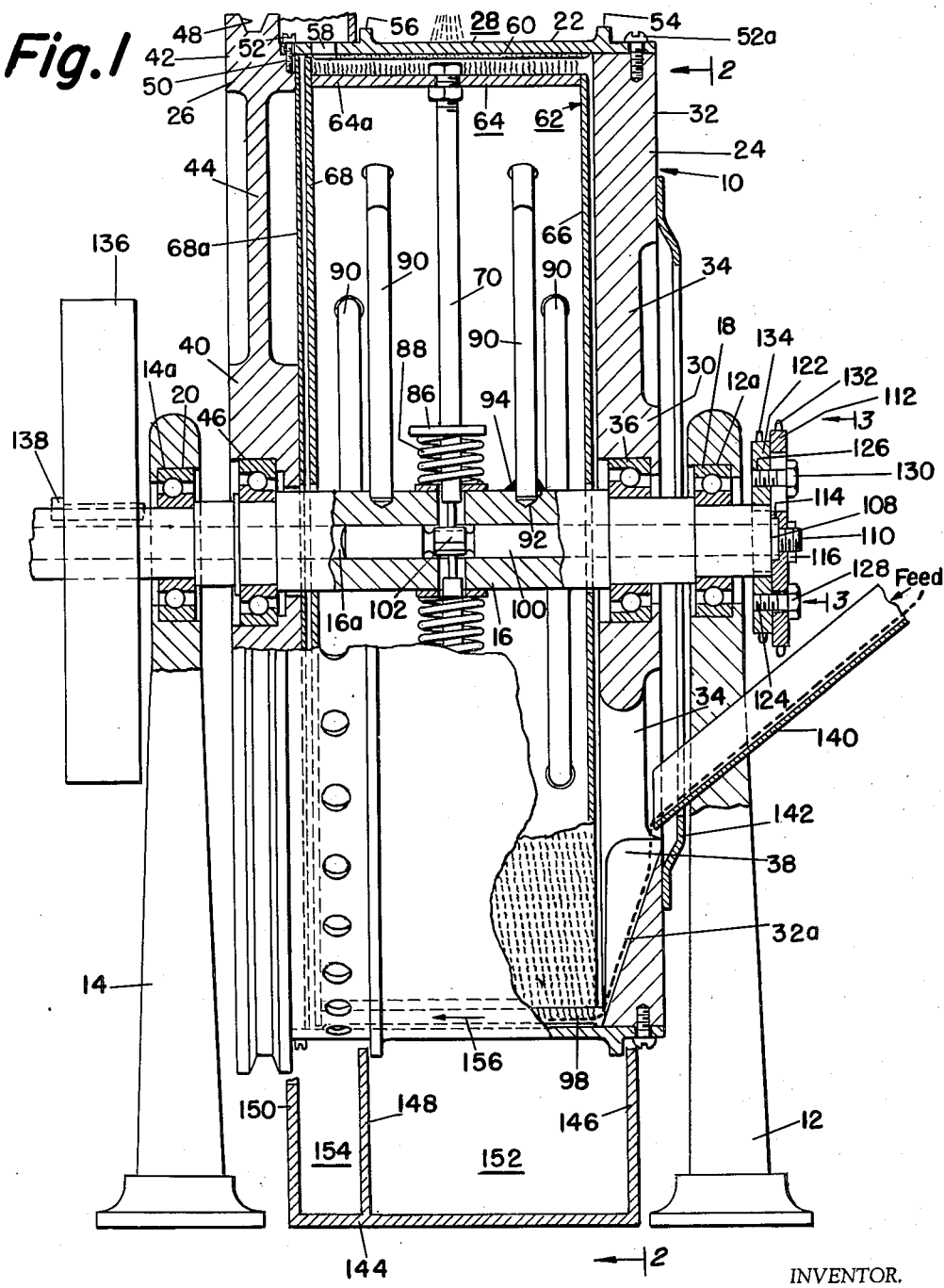
Figure 1 is a front elevational view, partially broken away and partially in section, of the scouring machine of the present invention.

Referring to the drawing, and initially to Figure 1, the scouring machine of the present invention is generally designated as 10.

Scouring machine 10 comprises a pair of spaced, upright mounting posts 12 and 14 having aligned openings 12a and 14a through their upper ends. A shaft 16 having a longitudinally extending bore 16a therethrough is mounted between mounting posts 12 and 14. The ends of shaft 16 extend through the openings 12a and 14a of the posts 12 and 14 and are rotatably supported in the openings 12a and 14a by ball bearings 18 and 20.

A casing, generally designated as 22, is rotatably mounted on shaft 16 between the mounting posts 12 and 14. Casing 22 comprises a pair of spaced wheels 24 and 26, and a wide, cylindrical ring 28 extending between and secured to the wheels 24 and 26.

Wheel 24 comprises a hub 30, a rim 32, and a plurality of radial spokes 34 connecting the hub 30 to the rim 32. Wheel 24 is rotatably supported on shaft 16 by a ball bearing 36. The inner surface 32a of the rim 32 of wheel 24 is tapered so that the outer periphery of the rim 32 is wider than the inner periphery of the rim 32. A plurality of circumferentially spaced fins 38 project from the inner surface 32a of the rim 32.

Wheel 26 comprises a hub 40, a rim 42 and a plurality of radial spokes 44 connecting the hub 40 to the rim 42. Wheel 26 is rotatably supported on shaft 16 by a ball bearing 46. Wheel 26 is larger in diameter than wheel 24, and has an annular V-shaped groove 48 in the periphery of its rim 42. Groove 48 is adapted to receive a drive belt, not shown, for rotating the wheel 26. The inner surface of the rim 42 of wheel 26 has a cylindrical ledge 50 of the same diameter as the outer diameter of wheel 24.

Ring 28 extends across the outer periphery of wheel 24 and the ledge 50 of wheel 26 and is secured to wheel 24 by screws 52a and to the ledge 50 of wheel 26 by screws 52. Ring 28 has a pair of spaced, annular ribs 54 and 56 projecting radially outwardly therefrom. Rib 54 is juxtaposed to wheel 24, and rib 56 is adjacent to but spaced from wheel 26. A plurality of circumferentially spaced holes 58 extend through the ring 28 between the wheel 26 and the rib 56. The inner surface of ring 28 is provided with a layer 60 of an abrasive material.

A cylindrical drum, generally designated as 62, is mounted on shaft 16 within the casing 22. Drum 62 comprises a wide cylindrical ring 64 which is concentric to but spaced inwardly from the ring 28 of casing 22. Ring 64 is divided circumferentially into four equal segments 64a. Each of the ring segments 64a has a pair of spaced, parallel, pie-shaped side plates 66 and 68 secured to the sides of the ring segment 64a. Sides 66 and 68 extend radially from the shaft 16 to the ring segments 64a. Sides 68 extend radially beyond the ring segments 64a to the inner surface of the ring 28 of casing 22. The four sides 66 lie in the same plane and fit together to form a circular side plate for the drum 62. Likewise the four sides 68 lie in the same plane and fit together to form a circular side plate for the drum 62. A circular side plate 68a is secured to the wheel 26 at the hub 40 and rim 42 and is juxtaposed to the sides 68.

Each of the ring segments 64a is mounted on shaft 16 by a radially extending mounting rod 70. Each of the mounting rods 70 is secured to its respective ring segment 64a midway between the ends of the ring segment 64a so that the mounting rods 70 are spaced apart approximately ninety degrees around the shaft 16. As shown, each of the mounting rods 70 has a threaded outer end 70a which extends through a hole 72 in its respective ring segment 64a. A pair of nuts 74 and 76 are threaded on the outer end 70a of each of the mounting rods 70. Nut 74 is within the ring segment 64a and nut 76 is outside of the ring segment 64a so that the nuts 74 and 76 clamp the ring segment 64a therebetween and secure the ring segment 64a to the mounting rod 70, and yet provide for facile removal of the ring segment 64a when necessary.

The inner end of each of the mounting rods 70 slidably fits in a radial hole 78 in the shaft 16. Four flat plates 80 are secured to the outer surface of shaft 16 by weldments 82. Plates 80 are equally spaced around the shaft 16 and are substantially tangential to the shaft 16. Each of the plates 80 has a hole 84 therethrough in alignment with a hole 78 in the shaft 16 through which a mounting rod 70 extends. Each of the mounting rods 70 has a radial flange 86 secured thereto adjacent to but spaced from the inner end of the mounting rod 70. A coil spring 88 surrounds each of the mounting rods 70 between the radial flange 86 and the plate 80. The ends of the coil spring 88 are secured to the radial flange 86 and the plate 80 respectively. Coil springs 88 are under tension so that they pull the mounting rods 70 radially inwardly.

Each of the ring segments 64a has four guide rods 90. The inner end of each of the guide rods 90 is secured in a socket 92 in the outer surface of shaft 16 by weldments 94. Guide rods 90 extend radially outwardly from shaft 16 to a point just within the ring segments 64a. The outer end 90a of each of the guide rods 90 is bent so that it is parallel to the mounting rod 70 of the respective ring segment 64a. The outer end 90a of each of the guide rods 90 extends through a hole 96 in its respective ring segment 64a. The four guide rods 90 for each of the ring segments 64a are positioned so that there are two guide rods 90 adjacent each end of the ring segment 64a.

A plurality of bristles 98 are fixed directly into the ring segments 64a across the entire width of the ring segments 64a following a helical path. I have found it preferable to form the bristles on two of the ring segments 64a, which are diametrically opposite to each other, of nylon bristles, and the bristles on the other two ring segments 64a of brass bristles.

Figure 2:
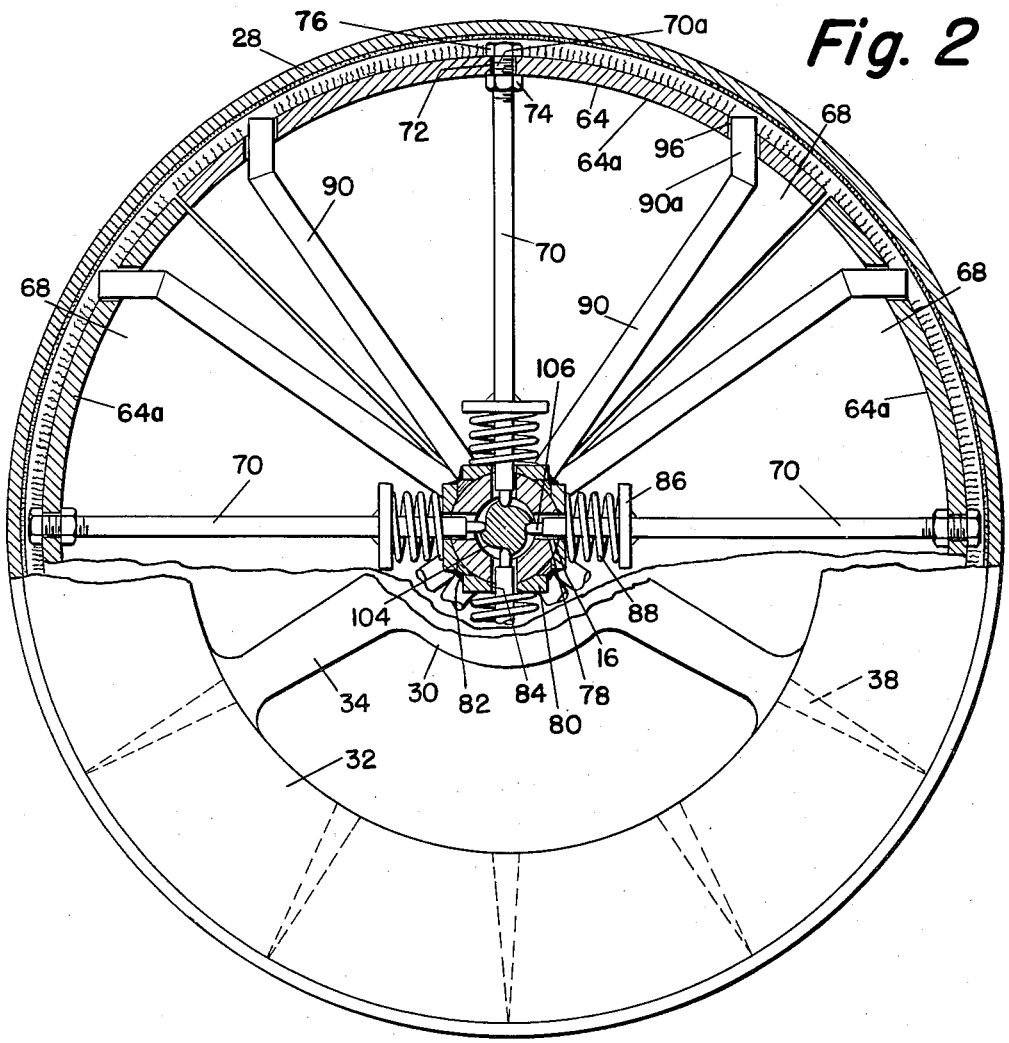
Figure 2 is a side view, partially broken away and partially in section, of the scouring machine of the present invetnion in reduced scale taken along line 2—2 of Figure 1.

A cam shaft 100 slidably fits within the bore 16a of shaft 16. Cam shaft 100 has a cam section 102 which is juxtaposed to the holes 78 in the shaft 16. As shown in Figure 2, cam section 102 of cam shaft 100 has four identical camming surfaces 104. Each of the camming surfaces 104 extends ninety degrees around the circumference of the cam section 102 along a spiral path. The smallest diameter end of each of the camming surfaces 104 is adjacent the largest diameter end of the adjacent camming surface 104. Each of the mounting rods 70 has a cam follower tip 106 projecting longitudinally from its inner end. Each of the cam follower tips 106 projects into the bore 16a of shaft 16 and rides on a camming surface 104. The cam follower tips 106 are held against the camming surfaces 104 by the springs 88. Each of the cam follower tips 106 engages its respective camming surface 104 at a point on the camming surface 104 of the same diameter. Thus, the cam shaft 100 maintains all the ring sections 64a at the same distance from the shaft 16.

Figure 3:
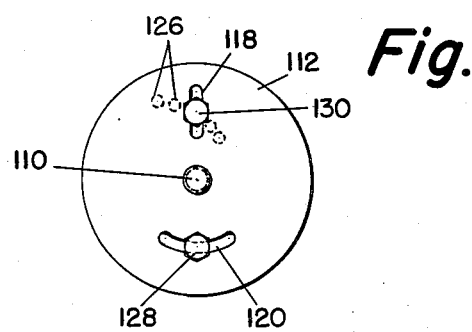
Figure 3 is an elevational view taken along line 3—3 in Figure 1.

Cam shaft 100 projects beyond the end of shaft 16 which is supported by mounting post 12. The outer end of cam shaft 100 has a non-circular head 108 and a threaded portion 110 projecting beyond the head 108. A circular plate 112 is mounted on the outer end 110 of cam shaft 100. Plate 112 has a non-circular counterbore 114 fitting around head 108 to prevent relative rotation between the plate 112 and the cam shaft 100. A nut 116 is threaded on the end 110 of cam shaft 100 to hold the plate 112 on the cam shaft 100. Plate 112 has a radial slot 118 therethrough, and an arcuate slot 120 therethrough diametrically opposite the radial slot 118 (see Fig. 3).

An indexing plate 122 is mounted on the end of shaft 16 adjacent plate 112. Indexing plate 122 has a threaded hole 124 therethrough in alignment with the arcuate slot 120 in the plate 112. Indexing plate 122 also has a plurality of circumferentially spaced threaded holes 126 therethrough which can be brought into alignment with the radial slot 118 in plate 112. Holes 126 are staggered radially to permit the holes 126 to be spaced closer together. A bolt 128 extends through the arcuate slot 120 in plate 112 and is threaded into the hole 124. A bolt 130 extends through the radial slot 118 in plate 112 and is threaded into the hole 126 which is in alignment with the radial slot 118.

By loosening bolt 128 and removing bolt 130, plate 112 can be rotated with respect to indexing plate 122 to bring the various holes 126 into alignment with the radial slot 118. Rotation of plate 112 with respect to indexing plate 122 rotates the cam shaft 100 with respect to shaft 16, and thereby rotates the cam surfaces 104 with respect to the cam follower tips 106. Rotation of the cam surfaces 104 with respect to the cam follower tips 106 moves the mounting rods 70 and thereby the ring segments 64a radially. Thus, the distance between the ring segments 64a and the casing ring 28 can be adjusted by rotating the plate 112 with respect to the indexing plate 122. When the desired spacing between the ring segments 64a and the casing ring 28 is so obtained, the bolt 130 is threaded into the hole 126 which is in alignment with the radial slot 118 and bolt 128 is tightened to lock the cam shaft 100 to the shaft 16. The holes 126 may be marked to indicate the spacing between rings 64 and 28 each hole 26 will provide. Plates 112 and 122 are provided with radially extending lugs 132 and 134 respectively by which the plates 112 and 122 may be easily rotated with respect to each other.

A pulley 136 is mounted on the end of shaft 16 adjacent the mounting post 14. Pulley 136 is secured to the shaft 16 by a key 138. Pulley 136 is adapted to receive a drive belt for rotating the pulley 136 which rotates the shaft 16 and the drum 62.

A feed chute 140 extends downwardly to the inner periphery of the rim 32 of the wheel 24 to feed the grain kernels to the scouring machine 10. A shield ring 142 is secured to the outer surface of wheel 24 to prevent the grain kernels from spraying back out of the scouring machine 10.

A trough 144 is mounted under the casing 22 of the scouring machine 10. Trough 144 has three side walls 146, 148, and 150 which divide the trough 144 into two compartments 152 and 154. Walls 146 and 148 of trough 144 overlap the ribs 54 and 56 on the casing ring 28 so that the ribs 54 and 56 extend into the compartment 152. The compartment 152 is provided to receive coolant fluid such as water which is dropped onto casing ring 28 between the ribs 54 and 56. Compartment 154 extends across the portion of casing ring 28 which contains the holes 58. The portion of trough 144 which forms the compartment 154 extends completely around the circumference of the casing ring 28.

The operation of the scouring machine 10 of the present invention is as follows:

The bristles 98 are properly positioned with respect to the abrasive layer 60 on the inner surface of the casing ring 28. This is accomplished by loosening bolt 128 and removing bolt 130 and rotating plate 112 with respect to plate 122. As previously described, this rotates the camming surfaces 104 to move the ring segments 64a and the bristles 98 radially with respect to the casing ring 28. When the bristles 98 are properly positioned with respect to the abrasive layer 60, the bolt 130 is threaded into the hole 126 which is in alignment with the radial slot 118 in the plate 112 and bolt 128 is tightened thereby locking the cam shaft 100 with respect to the shaft 16.

Pulley 136 is then rotated through an endless belt, not shown, which connects the pulley 136 to a source of power, not shown. Rotation of pulley 136 rotates shaft 16 and drum 62. Wheel 26 of casing 22 is rotated by means of an endless belt, not shown, which extends around the groove 48 in the outer periphery of the wheel 26 and connects the wheel 26 to a source of power, not shown. Wheel 26 is rotated in the direction opposite to the direction that shaft 16 and drum 62 are rotated. Rotation of wheel 26 rotates the entire casing 22. Thus, the bristles 98 are rotated in one direction and the abrasive layer 60 on the inner surface of the casing ring 28 is rotated in the opposite direction.

The kernels of the grain are fed down feed chute 140 onto the inner surfaces 32a of the rim 32 of casing wheel 24. The kernels of grain will slide radially outwardly along the inner surface 32a of rim 32 to the space between the drum ring 64 with its bristles 98 and the abrasive 60 of casing ring 28. Fins 38 direct the kernels towards the bristles 98. When the kernels of grain reach the space between the drum ring 64 and the casing ring 28, the kernels are pulled in by the bristles 98 and are scoured between the bristles 98 and the abrasive layer 60 on the inner surface of the casing ring 28. The helical arrangement of the bristles 98 on the drum ring 64 provides the bristles 98 with a feed screw action. Thus, the bristles 98 move the kernels of grain axially between the drum ring 64 and the casing ring 28 and its abrasive 60 in the direction of arrow 156 in Figure 1. As the kernels of grain are moved axially between the drum ring 64 and the casing ring 28 the kernels are provided with sufficient scouring action between the bristles 98 and the abrasive layer 60 to completely remove all layers of bran from the endosperm. It has been found that by rotating the drum ring 64 at a speed of approximately one and three-quarter to two and one-quarter meters per second and by rotating the casing ring 28 at a speed of approximately three-quarters to one and one-quarter meters per second the kernels of grain will be provided with sufficient scouring action to completely remove the outer layers of bran from the kernels. The axial movement of the scoured kernels of grain and the removed particles of bran are stopped by the outer edge of the side walls 68 of drum 62. The scoured kernels of grain and the removed particles of bran are then forced radially outwardly through the holes 58 in the casing ring 28 and are deposited in the compartment 154 of trough 144.

Cooling water runs continuously on the outer side of the ring 28. Such cooling water spreads between the ribs 54 and 56 and runs down the ring 28 into the compartment 152 of the trough 144. The cooling water may be recirculated from the compartment 152. The layer of water on the outer surface of the casing ring 28 will remove any heat generated by the scouring action to maintain the scouring machine 10 cool.

In case the dimension of the kernels being treated changes, or as the bristles 98 become worn during the operation of the scouring machine 10, the proper position of the bristles 98 with respect to the abrasive layer 60 can be easily and quickly reobtained. This is accomplished by removing bolt 130 and rotating plate 112 with respect to indexing plate 122. As previously described, this moves the ring segments 64a with their bristles, 98 radially outwardly toward the casing ring 28. When the proper position of the bristles 98 with respect to the abrasive layer 60 is again obtained, the bolt 130 is threaded into the hole 126 in plate 122 which is in alignment with the radial slot 118. Thus, as the bristles 98 become worn during the operation of the scouring machine 10, they can be easily and quickly adjusted to their proper position for scouring the kernels of grain.

The present invention may be embodied in other specific forms without departing from the spirit or essential attributes thereof and, accordingly, reference should be made to the appended claims, rather than to the foregoing specification as indicating the scope of the invention.

I claim:

1. A scouring machine comprising a pair of mounting posts, a shaft rotatably supported between said mounting posts, a cylindrical drum mounted on said shaft between said posts, said drum being rotatable with said shaft, said drum including a cylindrical ring substantially concentrtic with said shaft and side walls extending radially between the sides of said ring and said shaft, a cylindrical casing rotatably mounted on said shaft and surrounding said drum, said casing being adapted to be rotated in the direction opposite to the direction that the drum is rotated, said casing including a cylindrical ring surrounding and substantially concentric to said drum ring, said drum ring being divided circumferentially into four equal segments, a separate mounting rod extending radially between the ring section of each of said segments and said shaft and securing said segments to said shaft, meansf or moving said mounting rods radially of said shaft to adjust the distance between said drum segments and the casing ring, a plurality of circumferentially spaced bristles secured across the outer surface of said drum ring, a layer of an abrasive material covering the inner surface of said casing ring, said bristles cooperating with said abrasive layer for scouring materials passed between said rings, and means for feeding the material to be scoured to the space between said rings.

2. A scouring machine in accordance with claim 1 in which each of said drum segments has a guide rod extending between the shaft and the ring section of the segment, the inner end of each of said guide rods being secured to said shaft, and the outer end of each of said guide rods being parallel to the mounting rod of the respective drum segment and extending through a hole in the respective ring section.

3. A scouring machine in accordance with claim 2 in which the means for moving said mounting rods comprises a camming device carried by said shaft, and the inner end of each of said mounting rods is held in engagement with said camming device.

4. A scouring machine in accordance with claim 3 in which said camming device comprises a cam shaft extending through a longitudinal bore in said shaft, said cam shaft having four identical, circumferentially extending camming surfaces, and the inner end of each of said guide rods extends through a separate radial hole in said shaft and engages one of said camming surfaces.

5. A scouring machine in accordance with claim 4 in which said cam shaft projects beyond one end of said shaft, a plate is secured to the projecting end of said cam shaft, said plate has a slot therethrough, an indexing plate is secured to the end of said shaft adjacent said cam shaft plate, said indexing plate has a plurality of circumferentially spaced, threaded holes therethrough, said threaded holes are arranged so that upon rotation of said cam shaft plate with respect to said indexing plate the holes can be selectively brought into alignment with said slot in said cam shaft plate, and a bolt extends through said slot and is threaded into the hole which is in alignment with said slot, rotation of said cam shaft plate with respect to said indexing plate rotates said cam shaft with respect to said shaft so that the mounting rods and the drum segments are moved radially by the camming surfaces of said cam shaft.

6. A scouring machine in accordance with claim 4 in which a separate helical spring surrounds each of said mounting rods with the ends of each of the springs being connected to the shaft and the mounting rod respectively, said springs being under tension so that the springs hold the inner ends of the mounting rods against the camming surfaces.

7. A scouring machine in accordance with claim 1 in which the bristles on said drum ring extend across said drum ring along a helical path so that the bristles will move the material being scoured axially across the drum ring from the one casing wheel through which the material is fed to the other casing wheel, and the casing ring has a plurality of circumferentially spaced holes therethrough adjacent the other casing wheel through which holes the scouring material is discharged.

8. A scouring machine in accordance with claim 7 including a trough mounted beneath said casing, said trough having two compartments, one of said compartments surrounding the portion of the casing having the holes therethrough to receive the scoured material discharged through said holes, and the other compartment extending to the outer surface of said casing ring to receive cooling water.

9. A scouring machine in accordance with claim 1 in which the bristles comprise bristles of nylon and bristles of brass.

10. A scouring machine comprising a pair of mounting posts, a shaft rotatably supported between said mounting posts, a cylindrical drum mounted on said shaft between said posts, said drum being rotatable with said shaft, said drum including a cylindrical ring substantially concentric with said shaft and side walls extending radially between the sides of said ring and said shaft, a cylindrical casing rotatably mounted on said shaft and surrounding said drum, said casing being adapted to be rotated in the direction opposite to the direction that the drum is rotated, said casing including a pair of spaced side wheels rotatably mounted on said shaft on opposite sides of said drum and a cylindrical ring surrounding and substantially concentric to said drum ring extending between and secured to said wheels, each of said wheels comprising a hub, a rim, and a plurality of radial spokes connecting the hub to the rim, the inner surface of the rim of one of said wheels being inclined from the inner periphery of the rim to the outer periphery of the rim to feed the material to be scoured to the space between the drum ring and the casing ring, and a plurality of circumferentially spaced fins on the inclined inner surface of the rim to impart centrifugal force to the material, the other wheel having means by which the casing is rotated, a plurality of circumferentially spaced bristles secured across the outer surface of said drum ring, and a layer of an abrasive material covering the inner surface of said casing ring, said bristles cooperating with said abrasive layer for scouring materials being passed between said rings.

References Cited in the file of this patent

UNITED STATES PATENTS

| | | |
|---|---|---|
| 488,403 | Richter | Dec. 20, 1892 |
| 2,599,892 | Brown | June 10, 1952 |